United States Patent
Krichevsky et al.

(10) Patent No.: US 10,360,939 B2
(45) Date of Patent: Jul. 23, 2019

(54) METAL-INSULATOR-METAL NEAR-FIELD TRANSDUCER FOR HEAT-ASSISTED MAGNETIC RECORDING

(71) Applicants: Western Digital Technologies, Inc., San Jose, CA (US); The Provost, Fellows, Foundation Scholars and the other members of the Board, of the College of the Holy and Undivided Trinity of Queen Elizabeth Near Dublin, Dublin (IE)

(72) Inventors: Alexander Krichevsky, Cupertino, CA (US); Frank Bello, Jackson, CA (US); Christopher Wolf, San Jose, CA (US); Fenghua Zong, San Jose, CA (US); Daniel Wolf, San Jose, CA (US); David McCloskey, Co. Louth (IE); Kyle Ballantine, Limerick (IE); John Donegan, Co. Kildare (IE)

(73) Assignees: Western Digital Technologies, Inc., San Jose, CA (US); The Provost, Fellows, Scholars and other Members of Board of Trinity College Dublin, Dublin (IE)

( * ) Notice: Subject to any disclaimer, the term of this patent is extended or adjusted under 35 U.S.C. 154(b) by 0 days.

(21) Appl. No.: 15/853,768

(22) Filed: Dec. 23, 2017

(65) Prior Publication Data

US 2019/0198053 A1    Jun. 27, 2019

(51) Int. Cl.
G11B 13/08    (2006.01)
G11B 5/00    (2006.01)

(52) U.S. Cl.
CPC ...... *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,834,027 B1 | 12/2004 | Sakaguchi et al. | |
| 6,930,975 B2 * | 8/2005 | Tawa | B82Y 10/00 369/112.09 |
| 7,027,700 B2 * | 4/2006 | Challener | B82Y 20/00 385/129 |
| 7,272,079 B2 | 9/2007 | Challener | |

(Continued)

FOREIGN PATENT DOCUMENTS

| | | | |
|---|---|---|---|
| JP | 2007188619 A | | 7/2007 |
| JP | 2017040841 A | * | 2/2017 |

*Primary Examiner* — William J Klimowicz (57) ABSTRACT

Disclosed herein are embodiments of a heat-assisted magnetic recording (HAMR) device comprising a waveguide and a near-field transducer (NFT) coupled to the waveguide. The NFT comprises a core layer comprising an insulator, a first metal layer adjacent to the core layer, and a second layer adjacent to the first metal layer, wherein the second layer comprises a material that is substantially mechanically and thermally stable and thereby functions as a hard jacket to mitigate deformation of the NFT. The first metal layer may comprise a plasmonic metal, such as gold. The second layer may comprise tungsten, chromium, or a dielectric material.

18 Claims, 10 Drawing Sheets

(56) References Cited

U.S. PATENT DOCUMENTS

| | | | |
|---|---|---|---|
| 7,359,599 B2 * | 4/2008 | Matsumoto | G01Q 60/22 385/47 |
| 7,440,660 B1 | 10/2008 | Jin et al. | |
| 7,567,387 B2 | 7/2009 | Itagi et al. | |
| 7,596,072 B2 | 9/2009 | Buechel et al. | |
| 8,023,228 B2 * | 9/2011 | Sohn | G11B 5/02 360/128 |
| 8,077,559 B1 | 12/2011 | Miyauchi et al. | |
| 8,098,547 B2 * | 1/2012 | Komura | B82Y 20/00 360/59 |
| 8,125,856 B1 | 2/2012 | Li et al. | |
| 8,125,858 B2 * | 2/2012 | Hara | G11B 5/314 369/112.27 |
| 8,164,855 B1 * | 4/2012 | Gibbons | G11B 5/3116 360/125.74 |
| 8,169,861 B1 * | 5/2012 | Komura | G11B 5/3116 369/112.27 |
| 8,194,512 B2 * | 6/2012 | Stipe | G11B 5/6088 369/112.27 |
| 8,228,779 B2 | 7/2012 | Peng et al. | |
| 8,264,919 B2 | 9/2012 | Komura et al. | |
| 8,385,157 B1 | 2/2013 | Champion et al. | |
| 8,432,773 B2 * | 4/2013 | Hara | G11B 5/314 369/13.13 |
| 8,462,592 B1 | 6/2013 | Wolf et al. | |
| 8,565,049 B1 * | 10/2013 | Tanner | G11B 5/3136 369/13.03 |
| 8,619,512 B1 * | 12/2013 | Yuan | G11B 5/3136 369/13.33 |
| 8,675,457 B1 * | 3/2014 | Hirata | G11B 5/314 369/13.33 |
| 8,711,663 B1 * | 4/2014 | Sasaki | G11B 5/6088 369/13.13 |
| 8,767,348 B1 * | 7/2014 | Tanaka | G11B 5/6088 360/125.3 |
| 8,804,468 B2 * | 8/2014 | Zhao | G11B 5/3133 369/13.33 |
| 8,897,104 B1 | 11/2014 | Yan et al. | |
| 8,958,168 B1 * | 2/2015 | Yuan | G11B 5/1278 360/122 |
| 9,064,528 B1 | 6/2015 | Krichevsky et al. | |
| 9,147,415 B2 * | 9/2015 | Clinton | G11B 5/4866 |
| 9,165,569 B1 * | 10/2015 | Kobayashi | G11B 5/235 |
| 9,275,659 B2 | 3/2016 | Cheng et al. | |
| 9,330,702 B2 * | 5/2016 | Araki | G11B 5/6088 |
| 9,336,814 B1 | 5/2016 | Shi et al. | |
| 9,368,146 B2 * | 6/2016 | Lee | G11B 5/3133 |
| 9,484,051 B1 * | 11/2016 | Krichevsky | G11B 5/3133 |
| 9,640,202 B2 * | 5/2017 | Tanemura | G11B 5/84 |
| 2004/0001394 A1 * | 1/2004 | Challener | G11B 5/012 369/13.32 |
| 2004/0001421 A1 * | 1/2004 | Tawa | B82Y 10/00 369/112.28 |
| 2004/0062503 A1 * | 4/2004 | Challener | B82Y 20/00 385/129 |
| 2006/0075417 A1 * | 4/2006 | Miyanishi | G11B 5/1278 720/658 |
| 2011/0170381 A1 | 7/2011 | Matsumoto | |
| 2013/0028557 A1 * | 1/2013 | Lee | G02B 6/105 385/28 |
| 2013/0223196 A1 * | 8/2013 | Gao | G11B 5/6088 369/13.24 |
| 2015/0179197 A1 | 6/2015 | Clinton et al. | |
| 2016/0357035 A1 * | 12/2016 | Kamei | G02F 1/2257 |

* cited by examiner

METAL-INSULATOR-METAL NEAR-FIELD TRANSDUCER FOR HEAT-ASSISTED MAGNETIC RECORDING

CROSS-REFERENCE TO RELATED APPLICATIONS

This application is being filed on the same day as, and hereby incorporates by reference the entire contents of, U.S. patent application Ser. No. 15/853,770, entitled "ARCHITECTURE FOR METAL-INSULATOR-METAL NEAR-FIELD TRANSDUCER FOR HEAT-ASSISTED MAGNETIC RECORDING".

BACKGROUND

There is a continuing need to improve the recording density of data storage devices. Such data storage devices include magnetic storage devices, such as magnetic disk drives. The use of thin-film magnetic heads, such as a composite thin-film magnetic head, and higher-performance magnetic recording media has enabled some level of improvement in storage capacity. A thin-film magnetic head may stack, on a substrate, a read head, including a magnetoresistive element (hereinafter also referred to as MR element), and a write head, including an induction-type electromagnetic transducer. In a magnetic disk drive, the thin-film magnetic head is mounted on a slider that flies slightly above the surface of the magnetic recording medium.

Magnetic recording media used in magnetic recording devices, such as hard disk drives, are made of an aggregate of magnetic fine particles, and each bit is recorded using more than one magnetic fine particle. Recording density may be improved by reducing asperities at the borders between adjoining recording bits, which can be achieved by making the magnetic fine particles smaller and using a correspondingly-smaller write head. But decreasing the asperities at the borders between adjacent recording bits causes the thermal stability of magnetization of the magnetic fine particles to decrease with decreasing volume of the magnetic fine particles. To mitigate this problem, the anisotropic energy of the magnetic fine particles may be increased, but doing so leads to an increase in coercivity of the magnetic recording medium, which increases the difficulty of writing data. This problem is exacerbated because it can be difficult to generate a magnetic field having a sufficient magnitude using a small write head.

Heat-assisted magnetic recording (HAMR), also referred to in the art as thermally-assisted magnetic recording (TAMR) or energy-assisted magnetic recording (EAMR), has been developed to allow the use of smaller write heads with higher-coercivity magnetic recording media to improve areal density capacity. HAMR uses heat to lower the effective coercivity of a localized region on the magnetic media surface and writes data within this heated region. The data state becomes "fixed" upon the media cooling to ambient temperatures. Thus, in HAMR, a magnetic recording material with high magneto-crystalline anisotropy ($K_u$) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. The laser source may be a laser diode of InP type, GaAs type, GaN type, or the like, such as used in applications such as communications, optical disc storage, and material analysis. The laser source may emit laser light of any wavelength within the range of, for example, 375 nm to 1.7 µm. The laser source may be located on the slider or in a remote location. The waveguide may be made from any suitable material. For example, the waveguide may be polymer, quartz fiber, or plastic fiber.

A near-field transducer refers to "near-field optics," wherein light is passed through a first element with sub-wavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. A NFT may have a generally triangular output end, such that an evanescent wave generated at a surface of the waveguide couples to surface plasmons excited on the surface of the NFT, and a strong optical near-field is generated at the apex of the triangular output end. The NFT couples light onto the media at a spot of a size that is smaller than the optical diffraction limit, which heats a region of the media.

Typically, NFTs have two features: a large plasmon resonator made of a plasmonic metal (e.g., gold) that generates near-field light from plasmons excited by irradiation with light, and a smaller-scale structure, also made of a plasmonic metal, that creates a localized heating of the media by coupling the electromagnetic energy stored in the antenna to the media passing below the NFT. The plasmon resonator has a size that is less than or equal to the wavelength of the light being used to heat the media.

To write data, a magnetic field and heat are simultaneously applied to the area of the magnetic recording medium in which data is to be written. As a result, the temperature of the area increases and the coercivity decreases, thereby enabling the data to be written at a relatively modest field. In order to prevent unintended writing or erasing, the spot diameter of irradiated light should approximately match the size of a recorded bit.

A drawback of a NFT that generates near-field light by direct irradiation with light is the low efficiency of transformation of the applied light into near-field light. Most of the energy of the light applied to the NFT is lost, either by reflecting off the surface of the NFT or by being transformed into thermal energy and absorbed by the NFT. Because the NFT is small in volume, the temperature of the NFT can increase significantly when it absorbs the thermal energy. This temperature increase can cause the NFT to expand in volume and/or deform.

Figure 1A:
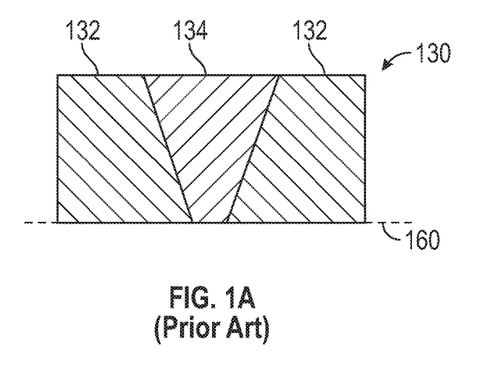
FIGS. 1A and 1B illustrate a prior-art IMI NFT.
Figure 1B:
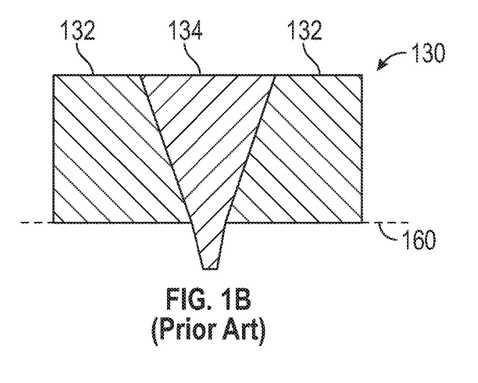

FIG. 1A illustrates a cross-section of a prior-art NFT 130 in which a metal layer 134 is encased within an insulator layer 132 in a construct known in the art as the "insulator-metal-insulator" or "IMI" configuration. Because plasmonic metals have higher thermal expansion coefficients than dielectrics, as the NFT 130 heats up, the mismatch of thermal expansion coefficients between the metal layer 134 and the encasing insulator layer 132 creates high pressure, which causes plastic deformation or "flow" of the plasmonic metal. (As would be appreciated by a person having ordinary skill in the art, a material's thermal expansion coefficient describes how the size of an object made from the material changes with a change in temperature. Specifically, the thermal expansion coefficient characterizes the fractional change in size per degree change in temperature at a constant pressure.) The amount of pressure developed is proportional to the product of (i) the mismatch of the coefficients of the thermal expansion, (ii) temperature, and (iii) the volume of the plasmonic metal in the NFT. The temperature increase in an IMI implementation may cause a large, sharp pinpoint protrusion of the NFT 130 from the ABS 160 and toward the media passing below the slider, as shown in FIG. 1B. If the slider fly height is not adjusted to account for the protrusion, the protrusion may touch the magnetic recording medium, potentially shearing off and/or causing damage to or failure of the magnetic recording device. Alternatively, the protrusion can result in the slider having to fly at a larger distance from the magnetic recording medium than the optimal height, which may adversely affect the ability of the read head to read data on the magnetic recording medium.

An example of an IMI NFT is the so-called "lollipop" NFT, which has an enlarged disk-shaped region as the large plasmonic resonator and a peg as the smaller-scale structure. The tip of the peg, at the slider ABS, may be covered in a thin layer of diamond-like carbon (DLC). In lollipop NFTs, the enlarged disk-shaped region receives concentrated light through the waveguide and is designed to help the NFT achieve surface plasmon resonance in response to this concentration of light. The disk-shaped region typically comprises most of the volume (e.g., between 90% and 95%) of the NFT. The peg is in optical and/or electrical communication with the disk-shaped enlarged region and creates a focal point on the media for the energy received by the enlarged region. Because the disk-shaped region is large in comparison to the peg, and the disk-shaped region is encased in an insulator that does not expand at the same rate as the plasmonic metal of the disk-shaped region, temperature increases of the disk-shaped region cause the smaller peg to expand in a way that is relatively dramatic. For example, the pressure developed because of the mismatch of thermal expansion coefficients between the plasmonic metal and the encasing insulator may cause the peg to elongate, potentially breaking the DLC protective layer at the ABS. In addition or instead, the peg may protrude, temporarily or permanently, toward the media as the disk-shaped region temperature increases and then retreat away from the media as the disk-shaped region's temperature decreases. These deformations of the peg can reduce the effectiveness of the NFT and the performance of the HAMR device. They may also lead to failure of the magnetic storage device or shorten its life considerably.

Figure 2A:
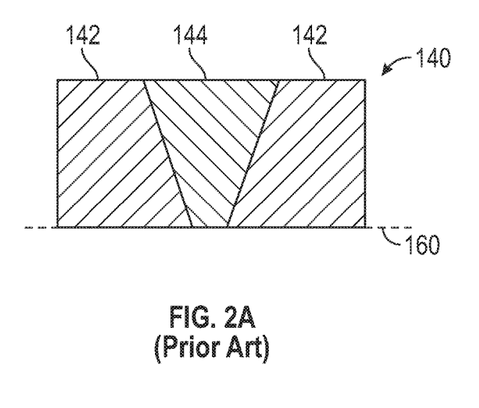
FIGS. 2A and 2B illustrate a prior-art MIM NFT.
Figure 2B:
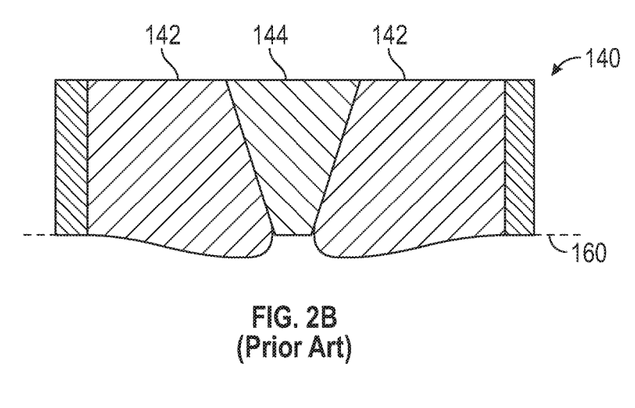

FIG. 2A illustrates another NFT implementation 140, in which an insulator layer 144 is encased in a metal layer 142 comprising a plasmonic metal in a configuration known in the art as a "metal-insulator-metal" or "MIM" configuration. As shown in FIG. 2B, temperature increases may cause the metal layer 142 of the MIM NFT 140 to protrude from the ABS 160 in a more moderate and smooth way. Even in this configuration, however, repeated deformation of the NFT can adversely affect the expected life of the magnetic recording device.

There is, therefore, a continuing need for improved NFT designs that control NFT deformations better than prior-art designs.

SUMMARY

Disclosed herein are novel NFTs, heat-assisted magnetic recording (HAMR) devices including such NFTs, and magnetic storage devices comprising such HAMR devices. In some embodiments, a HAMR device comprises a waveguide, and a near-field transducer (NFT) coupled to the waveguide. The NFT comprises a core layer comprising an insulator, a first metal layer adjacent to the core layer, and a second layer adjacent to the first metal layer, wherein the second layer comprises a material that is substantially mechanically and thermally stable. In some embodiments, the first metal layer comprises a plasmonic metal, and the thickness of the first metal layer is no less than the skin depth of the plasmonic metal. In some embodiments, the first metal layer comprises a plasmonic metal, and wherein the thickness of the first metal layer is substantially equal to the skin depth of the plasmonic metal.

In some embodiments, the first metal layer comprises gold or a gold alloy. In some such embodiments, the thickness of the first metal layer is between approximately 30 nm and 100 nm.

In some embodiments, the first metal layer comprises Pd, Pt, Rh, Ir, Ru, Au, Cu, Al, Ag, or an alloy of two or more of Pd, Pt, Rh, Ir, Ru, Au, Cu, Ag, and Al.

In some embodiments, the thermal expansion coefficient of the second layer is lower than the thermal expansion coefficient of the core layer. In some embodiments, the thermal expansion coefficient of the core layer is substantially matched by the thermal expansion coefficient of a combination of the first metal layer and the second layer.

In some embodiments, the material of the second layer comprises tungsten, chromium, or a dielectric material. In some embodiments, the material comprises SiC.

In some embodiments, the thickness of the second metal layer is at least 2 nm.

In some embodiments, the waveguide and NFT are in a direct-fire configuration. In some such embodiments, the HAMR device also includes an anti-reflective trench between the waveguide and the NFT. In some such embodiments, the HAMR device also includes at least one mirror adjacent to the anti-reflective trench and adjacent to the second metal layer. The at least one mirror may have an offset lip.

In some embodiments in which the waveguide and NFT are in a direct-fire configuration, the first metal layer extends a first distance to the ABS of the HAMR device, and the second layer extends a second distance toward the ABS of the HAMR device, the second distance being less than the first distance, and the HAMR device includes a dielectric layer extending from the end of the second layer to the ABS.

In some embodiments, the HAMR device also includes at least one mirror adjacent to the second layer, which may have an offset lip.

In some embodiments, the first metal layer extends a first distance to the ABS of the HAMR device, and the second layer extends a second distance toward the ABS of the HAMR device, the second distance being less than the first distance, and the HAMR device includes a dielectric layer extending from the end of the second layer to the ABS.

In some embodiments, the shape of at least a portion of the core layer viewed from the ABS of the HAMR device is triangular. In other embodiments, at least a portion of the core layer viewed from the ABS of the HAMR device has an L-shape, a C-shape, an E-shape, or a tapered shape.

In some embodiments, a magnetic storage device includes a write pole and the HAMR device.

In some embodiments, a near-field transducer comprises a core layer comprising an insulator, a first metal layer at least partially encasing the core layer, the first metal layer comprising a plasmonic metal, and a hard jacket at least partially encasing the first metal layer. The hard jacket may comprise, for example, tungsten, chromium, or a dielectric material. In some embodiments, the hard jacket comprises SiC. In some embodiments, the thickness of the hard jacket is at least 2 nm.

In some embodiments, the thickness of the first metal layer is no less than a skin depth of the plasmonic metal. In some embodiments, the first metal layer comprises gold or a gold alloy. In some such embodiments, the thickness of the first metal layer is between approximately 30 nm and 100 nm. In some embodiments, the first metal layer comprises Pd, Pt, Rh, Ir, Ru, Au, Cu, Al, Ag, or an alloy of two or more of Pd, Pt, Rh, Ir, Ru, Au, Cu, Ag, and Al.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim or claims.

Figure 3:
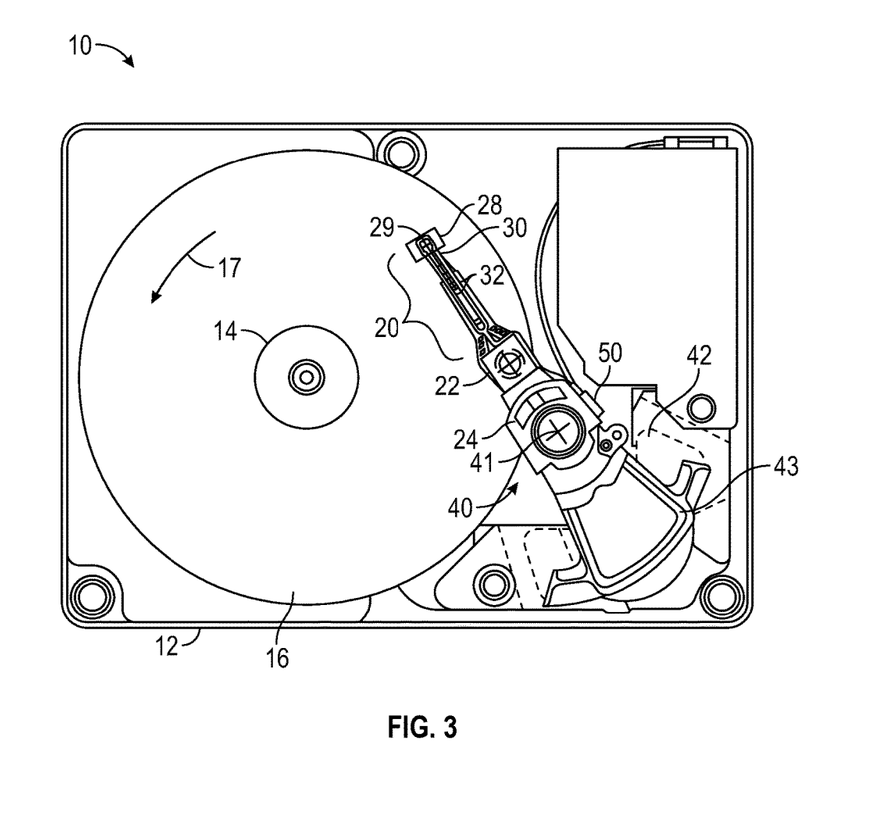
FIG. 3 illustrates a magnetic storage device that may incorporate various of the embodiments disclosed herein.

FIG. 3 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing surface of slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 3, is secured to a side of the E-block 24. The chip 50 includes a read/write integrated circuit (R/W IC).

As the disk 16 rotates, the disk 16 drags air under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

The slider 28 supports a read/write head 29, which in at least some of the embodiments disclosed herein is a HAMR head that includes an inductive write head, the NFT, and an optical waveguide. (As stated previously, the term "HAMR" as used herein refers to all variants of thermally-assisted recording, including TAMR, EAMR, and HAMR.) A semiconductor laser with a wavelength (for example, of 780 to 980 nm) may be used as the HAMR light source. The laser may be supported on the top of the slider 28, or it may be located on the flexure 30 and coupled to the slider 28 by an optical channel. As the disk 16 rotates in the direction of the arrow 17, the movement of the actuator assembly 40 allows the HAMR head on the slider 28 to access different data tracks on the disk 16. The slider 28 is typically formed of a composite material, such as a composite of alumina/titanium-carbide (Al$_2$O$_3$/TiC). FIG. 3 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 4A:
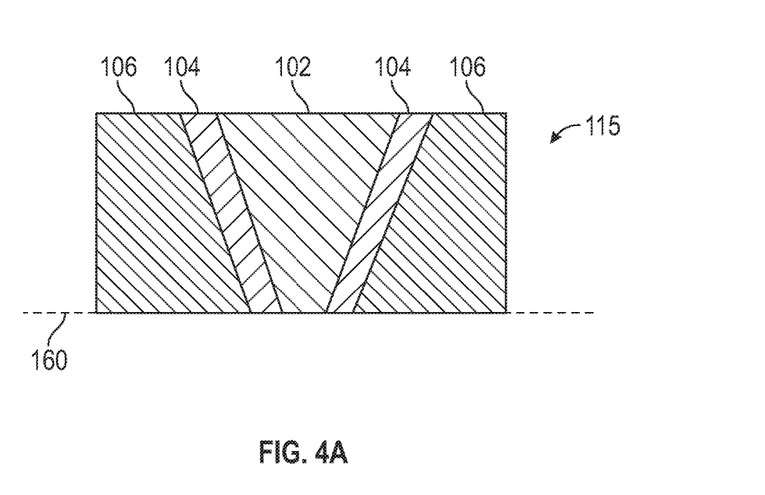
FIGS. 4A and 4B illustrate a new NFT in accordance with some embodiments.

FIG. 4A illustrates a NFT 115 in accordance with some embodiments. The NFT 115 has a core layer 102, a first metal layer 104 adjacent to (i.e., in contact with) the core layer, and a second layer 106 adjacent to (i.e., in contact with) the first metal layer. The core layer 102 comprises an insulator, such as, for example SiO$_2$.

The first metal layer 104 comprises a conductive material, such as a plasmonic metal. The first metal layer 104 may comprise, for example, a pure plasmonic metal or an alloy of two or more plasmonic metals. Plasmonic metals include, for example, gold (Ag), palladium (Pd), platinum (Pt), rhodium (Rh), iridium (Ir), ruthenium (Ru), silver (Au), copper (Cu), and aluminum (Al). The first metal layer 104 may have a thickness that is no less than the skin depth of the plasmonic metal (or alloy) of which the first metal layer 104 is made. In some embodiments, the first metal layer 104 has a thickness that is approximately equal to the skin depth of the plasmonic metal (or alloy) of which the first metal layer 104 is made. For example, when the first metal layer 104 comprises gold or a gold alloy, the thickness of the first metal layer 104 maybe between approximately 30 nm and 100 nm.

The second layer 106 comprises a material that is both mechanically and thermally stable in the temperature range in which the NFT 115 is expected to operate. "Mechanically and thermally stable" as used herein means the material does not deform substantially nor do its structural properties change substantially as the temperature of the NFT 115 varies within the expected operating range. Outside of the expected operating range, the second layer 106 might not be mechanically and thermally stable. Thus, the second layer 106 is referred to herein as "substantially mechanically and thermally stable" to indicate that at least in the temperature range in which the NFT 115 is expected to operate, the second layer 106 is mechanically and thermally stable. Because the second layer 106 is substantially mechanically and thermally stable, it may be considered to be a hard jacket that at least partially encases the first metal layer 104. The material of the second layer 106 may be a hard metal, such as, for example, tungsten or chromium, or it may be a dielectric material (e.g., SiC). In some embodiments, the thickness of the second layer is at least 2 nm.

In some embodiments, the thermal expansion coefficient of the second layer 106 is lower than the thermal expansion coefficient of the core layer 102 so that when the temperature of the NFT 115 increases, the second layer 106 prevents the first metal layer 104 from protruding or deforming significantly. In some embodiments, the thermal expansion coefficient of the core layer 102 is substantially matched by the thermal expansion coefficient of the combination of the first metal layer 104 and the second layer 106 so that when the temperature of the NFT 115 increases, the change in size of the first metal layer 104 and the second layer 106 compensates for or cancels the change in size of the core layer 102, or vice versa. In other words, the thermal expansion coefficients of the core layer 102, the first metal layer 104, and the second layer 106 interact such that the overall size and structural stability of the NFT 115 remains approximately constant over the entire operating temperature range of the NFT 115.

Figure 4B:
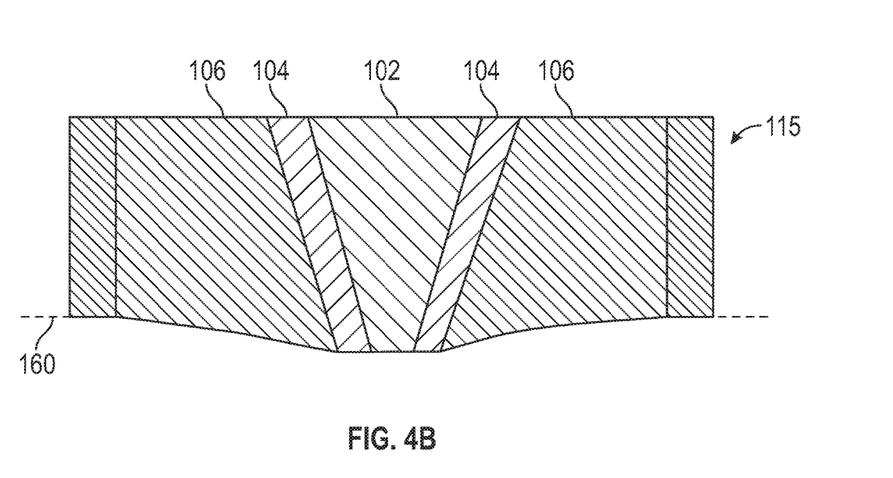

FIG. 4A illustrates the NFT 115 at ambient temperature. FIG. 4B illustrates how the NFT 115 of FIG. 4A changes as its temperature increases. As shown, the combination of the first metal layer 104 and the second layer 106 results in a small, smooth combined protrusion of the NFT 115 at the ABS 160 as opposed to the more substantial protrusion of the metal layer 142 in the prior-art MIM NFT 140 shown in FIG. 2B and the large, sharp protrusion of the metal layer 134 of the prior-art IMI NFT 130 shown in FIG. 1B. The hard shell provided by the second layer 106, which is sometimes referred to herein as a hard jacket, prevents the more radical deformations of prior-art NFTs that degrade NFT performance, reduce HAMR device lifespans, and contribute to HAMR device failures.

Figure 5A:
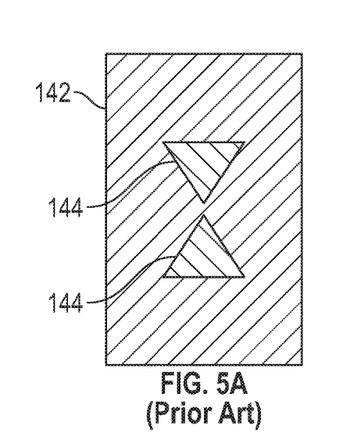
FIG. 5A is an ABS view of a prior-art MIM NFT.

FIG. 5A is an ABS view of a prior-art MIM NFT having a so-called "bow-tie" configuration. A plasmonic metal layer 142 encases the bow-tie-shaped insulator layer 144. The NFT of FIG. 5A suffers from the drawbacks discussed in the context of FIGS. 2A and 2B.

Figure 5B:
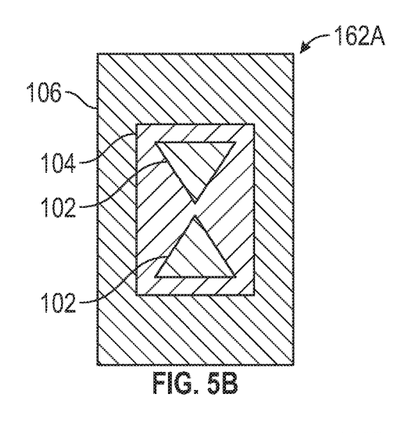
FIGS. 5B through 5F are ABS views of new MIM NFTs with improved performance in accordance with some embodiments.

FIGS. 5B through 5F are ABS views of NFTs with improved performance in accordance with some embodiments. FIG. 5B is an ABS view of a bow-tie MIM NFT 162A with a hard jacket encasing the plasmonic metal. As shown in FIG. 5B, at least a portion of the core layer 102 has the shape of a triangle. The core layer 102 is encased in a first metal layer 104, which comprises a plasmonic metal (or alloy) as explained previously. The first metal layer 104 is encased by a second layer 106, which comprises a hard metal or dielectric, as discussed previously.

Figure 5C:
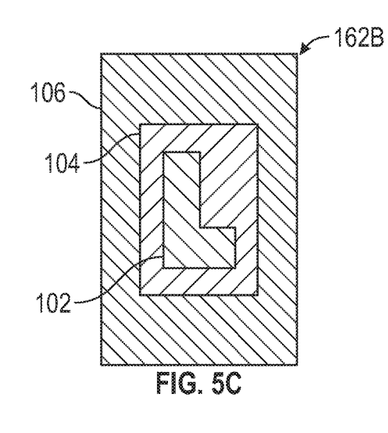

FIG. 5C is an ABS view of an L-aperture MIM NFT 162B with a hard jacket encasing the plasmonic metal. The core layer 102, which is L-shaped in the ABS view, is encased in a first metal layer 104, which comprises a plasmonic metal (or alloy) as explained previously. The first metal layer 104 is encased by a second layer 106, which comprises a hard metal or dielectric, as discussed previously.

Figure 5D:
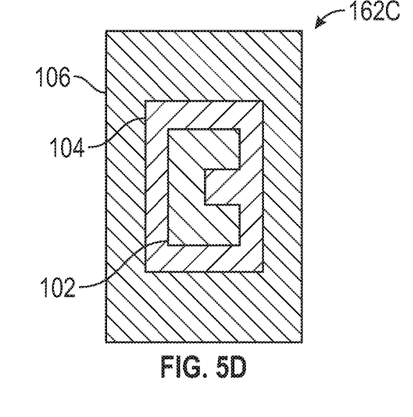

FIG. 5D is an ABS view of a C-aperture MIM NFT 162C with a hard jacket encasing the plasmonic metal. The core layer 102, which is C-shaped in the ABS view, is encased in a first metal layer 104, which comprises a plasmonic metal (or alloy) as explained previously. The first metal layer 104 is encased by a second layer 106, which comprises a hard metal or dielectric, as discussed previously.

Figure 5E:
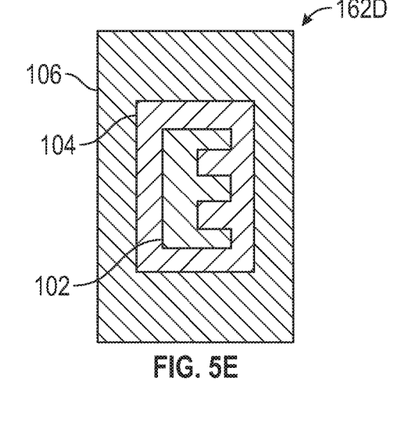

FIG. 5E is an ABS view of an E-aperture MIM NFT 162D with a hard jacket encasing the plasmonic metal. The core layer 102, which is E-shaped, is encased in a first metal layer 104, which comprises a plasmonic metal (or alloy) as explained previously. The first metal layer 104 is encased by a second layer 106, which comprises a hard metal or dielectric, as discussed previously.

Figure 5F:
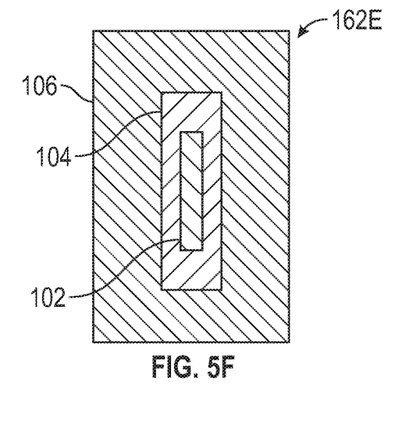

FIG. 5F is an ABS view of a tapered MIM NFT 162E with a hard jacket encasing the plasmonic metal. The core layer 102 is encased in a first metal layer 104, which comprises a plasmonic metal (or alloy) as explained previously. The first metal layer 104 is encased by a second layer 106, which comprises a hard metal or dielectric, as discussed previously.

Figure 6:
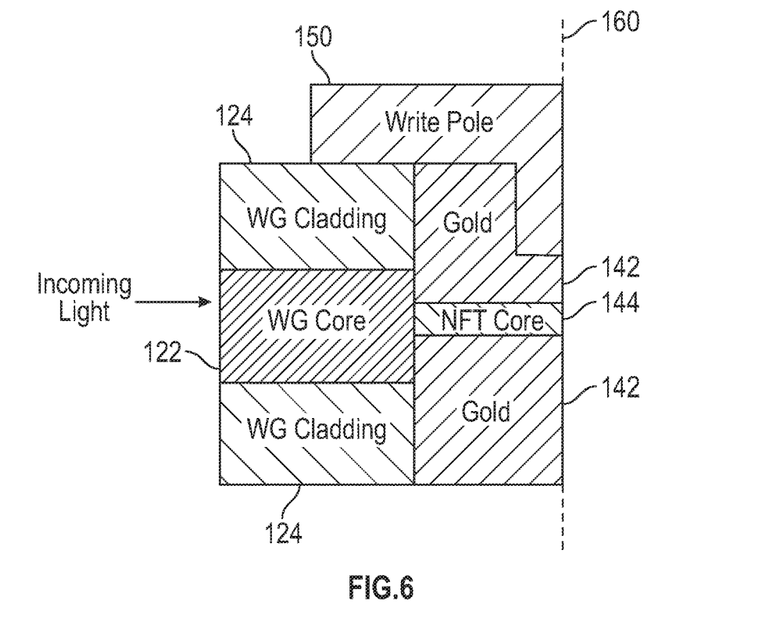
FIG. 6 illustrates a cross-section of a portion of a prior-art HAMR device.

FIG. 6 illustrates a cross-section of a portion of a HAMR device without a hard jacket. In operation, light from a laser (not shown) is transmitted to the waveguide, which includes a waveguide core 122 and waveguide cladding 124. The light propagates through the waveguide core 122 and couples into the NFT, shown as a MIM NFT that has a core layer 144 encased in a metal layer 142, which may be made of, for example, gold or another plasmonic metal or alloy. Light concentrated in the waveguide core 122 couples into the NFT to excite plasmons in the NFT. The configuration shown in FIG. 6 is referred to as a "direct-fire" configuration because the NFT is aligned with the waveguide core 122 in the direction of transmission of the light. Thus, light localized in the waveguide core 122 is directly fired at the NFT, which transfers energy to the media in a desired region. One or more coils (not shown) energize the write pole 150, which writes to the desired portion of the media passing below the ABS 160.

Figure 7A:
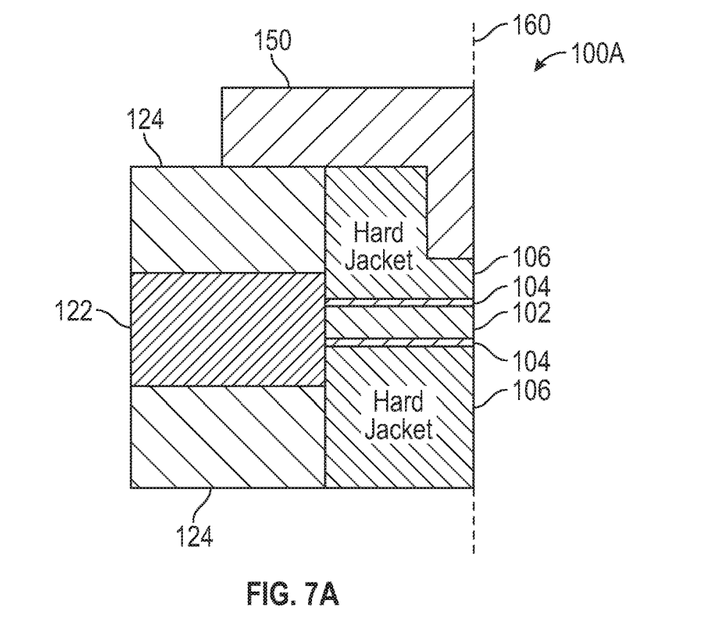
FIG. 7A is a cross-section of a portion of a new HAMR device in accordance with some embodiments.

FIG. 7A is a cross-section of a portion of a HAMR device 100A that includes a hard jacket (e.g., the NFT 115 of FIGS. 4A and 4B or any of FIGS. 5B through 5F) in accordance with some embodiments. Like the HAMR device illustrated in FIG. 6, the HAMR device 100A has the waveguide and NFT in a direct-fire configuration. The waveguide includes a waveguide core 122 and waveguide cladding 124. The light propagates through the waveguide core 122 and couples into the NFT, which has a core layer 102 encased in (i.e., adjacent to and in contact with) a first metal layer 104. The first metal layer 104 is encased in a second layer 106, which forms a hard jacket around the first metal layer 104. As described previously in the discussion of FIGS. 4A and 4B, the first metal layer 104 comprises a plasmonic metal, such as a pure plasmonic metal, an alloy of two or more plasmonic metals, or an alloy that includes at least one plasmonic metal, examples of which are provided above. As also described previously in the discussion of FIGS. 4A and 4B, the second layer 106 comprises a material that is both mechanically and thermally stable in the temperature range in which the NFT is expected to operate. For example, the second layer 106 may be a dielectric (e.g., SiC) or a hard metal (e.g., tungsten, chromium).

Figure 7B:
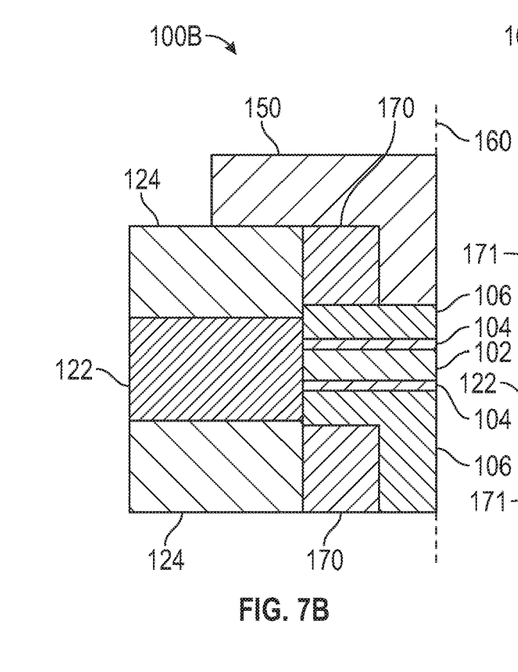
FIG. 7B is a cross-section of a portion of a new HAMR device in accordance with some embodiments.

The light in the waveguide extends into the waveguide cladding 124, which, as shown in FIG. 7A, abuts the second layer 106. Because the second layer 106 has poorer electric and heat conductivity than the first metal layer 104 (i.e., it is a less good heat sink), the light in the waveguide cladding 124 may cause unnecessary heating of the second layer 106, which can heat the write pole 150. FIG. 7B is a cross-section of a HAMR device 100B that adds at least one mirror 170 to the configuration of FIG. 7A to mitigate this problem by reflecting light back to the waveguide cladding 124 and to mitigate excessive heating of the write pole 150 and the NFT itself. In FIG. 7B, the at least one mirror 170 abuts (i.e., is adjacent to) the second layer 106 at and near the interface between the waveguide and the NFT to reduce electric field penetration into (and heating of) the second layer 106 material and the write pole 150. The at least one mirror 170 may comprise a metallic, magnetic, and/or conductive material (e.g., Cu, Ag, Au, Al, Rh, Ti, Cr, Mo, Fe, Co, or Ni, or an alloy comprising Cu, Ag, Au, Al, Rh, Ti, Cr, Mo, Fe, Co, or Ni).

Figure 7C:
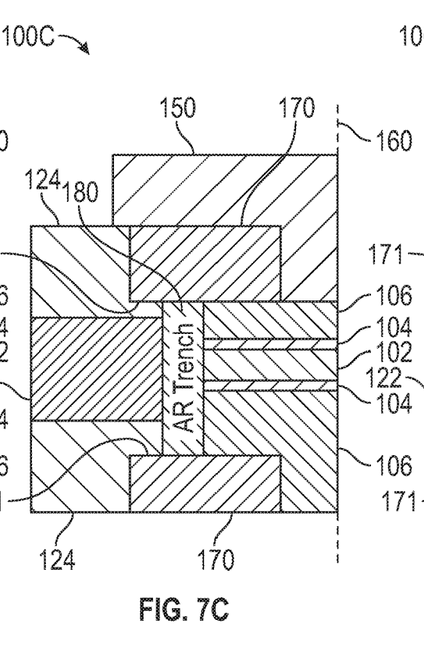
FIG. 7C is a cross-section of a portion of a new HAMR device in accordance with some embodiments.

As illustrated in FIG. 7C, the at least one mirror 170 may also be configured to provide an anti-reflective (AR) feature. Specifically, the at least one mirror 170 may have at least one offset lip 171 adjacent to the waveguide cladding 124 (where "offset" means that the edge of the at least one mirror 170 is not coincident with the end of the waveguide core 122 closest to the NFT). The position of the at least one mirror 170, and, therefore, the size of the offset lip 171, may be selected to cause an out-of-phase reflection of the incoming wave to at least partially cancel the incoming wave.

In addition or alternatively, and as also shown in FIG. 7C, the HAMR device 100C may include an anti-reflective (AR) trench 180 between the waveguide and the NFT. The AR trench 180 may be used in conjunction with or instead of the at least one mirror 170 (regardless of whether the at least one mirror 170 has an offset lip 171). The AR trench 180 may be adjacent to a mirror 170. The AR trench 180 is so named because it may be fabricated by forming a trench and filling the trench with a material. The material used for the AR trench 180 may be a dielectric, such as, for example, a material with an impedance that matches the impedance of the NFT. As an example, the material used for the AR trench 180 may have a refractive index of around 2 (e.g., $SiO_2$, SiN, etc.). The AR trench 180 attenuates reflected light or prevents reflected light from traveling back toward the laser. AR trenches are described in U.S. Pat. No. 9,484,051 to Krichevsky et al., the entirety of which is hereby incorporated by reference.

Figure 7D:
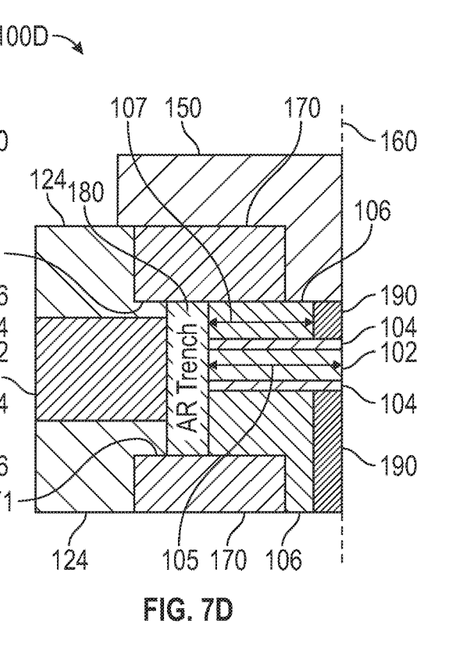
FIG. 7D is a cross-section of a portion of a new HAMR device in accordance with some embodiments.

FIG. 7D is a cross-section of a HAMR device 100D that includes a layer 190 at the ABS 160 to further mitigate protrusion of the NFT from the ABS 160. In the embodiment of FIG. 7D, the first metal layer 104 extends a first distance 105 to the ABS 160, and the second layer 106 extends a second distance 107 toward the ABS 160, where the second distance 107 is less than the first distance 105, the difference between the first and second distances 105, 107 being the thickness of the layer 190. The layer 190 comprises a hard material, which is preferably a hard dielectric material (e.g., with a low K value). The hard dielectric material may be, for example, a crystalline material grown at a suitably low temperature to improve both heat-sinking and longevity of the HAMR device 100D. For example, the layer 190 may comprise diamond, SiC, SiN, or any suitable hard and/or transparent material.

It is to be understood that although FIG. 7D illustrates an AR trench 180, at least one mirror 170 with an offset lip 171, and the layer 190, these features need not all be used together. For example, an embodiment could include only the layer 190 but not the AR trench 180 or the at least one mirror 170. Furthermore, embodiments that include the at least one mirror 170 need not have the offset lip 171. Thus, it is to be appreciated that fewer than all of the features illustrated in FIG. 7D may be present in a HAMR device.

Figure 8A:
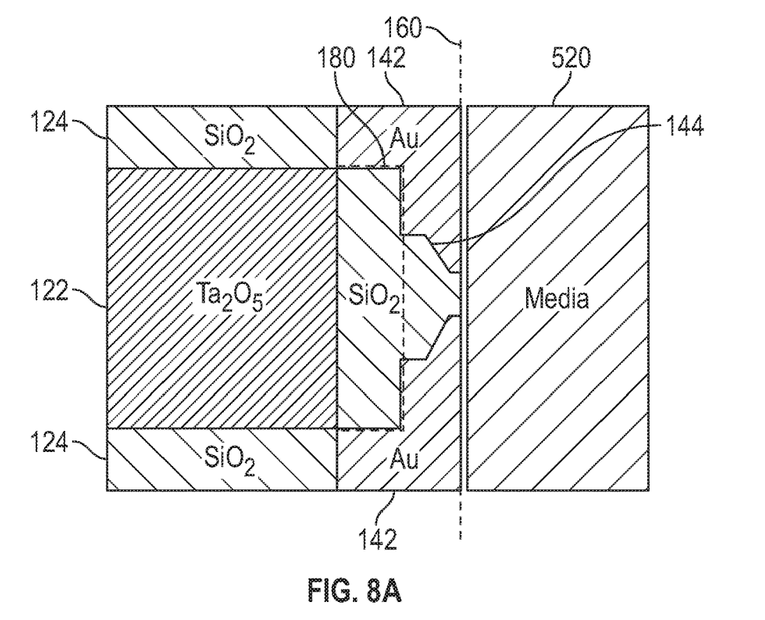
FIG. 8A is a cross-section of a new HAMR device with a MIM NFT but without a hard jacket.

To assess the impact on HAMR devices of NFTs using a hard jacket to improve NFT durability and thereby extend HAMR device lifespans, the inventors configured and ran optical and thermal simulations for several embodiments with and without hard jackets. FIGS. 8A through 8D are cross-sections of portions of the simulated HAMR devices. FIG. 8A is a cross-section of a portion of a HAMR device with a MIM NFT but without a hard jacket (i.e., without the second layer 106). The HAMR device includes a $SiO_2$ core layer 144, a gold metal layer 142, a waveguide core 122 of $Ta_2O_5$, waveguide cladding 124 of $SiO_2$, and an AR trench 180 of $SiO_2$. These elements were described previously in the context of other drawings and have the same reference numbers in FIG. 8A.

Figure 8B:
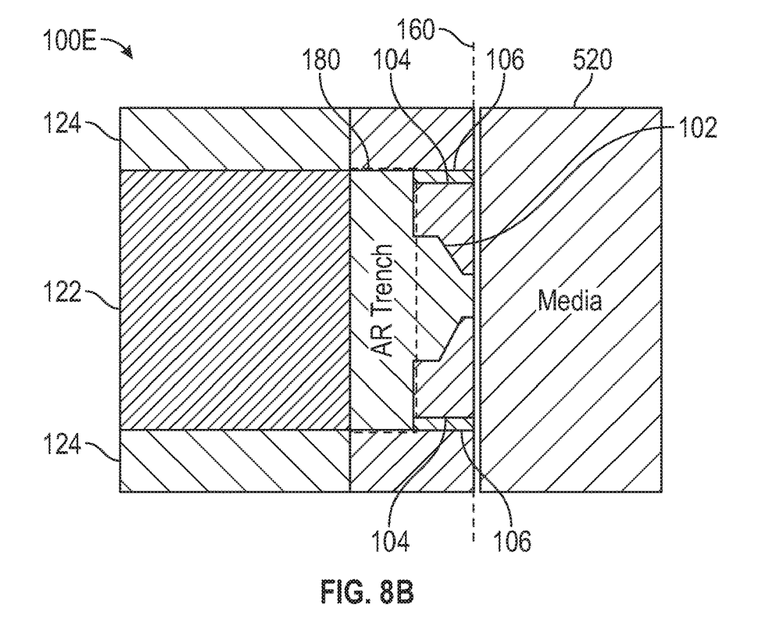
FIG. 8B is a cross-section of a new HAMR device with a hard jacket in accordance with some embodiments.

FIG. 8B is a cross-section of a new HAMR device 100E that includes a core layer 102 of $SiO_2$, a first metal layer 104 of gold (Au), and a second layer 106 of tungsten (W). These layers were described previously and have the same reference numbers as in previous drawings. The HAMR device 100E also includes a waveguide core 122 of $Ta_2O_5$, waveguide cladding 124 of $SiO_2$, and an AR trench 180 of $SiO_2$, all of which are as described previously.

Figure 8C:
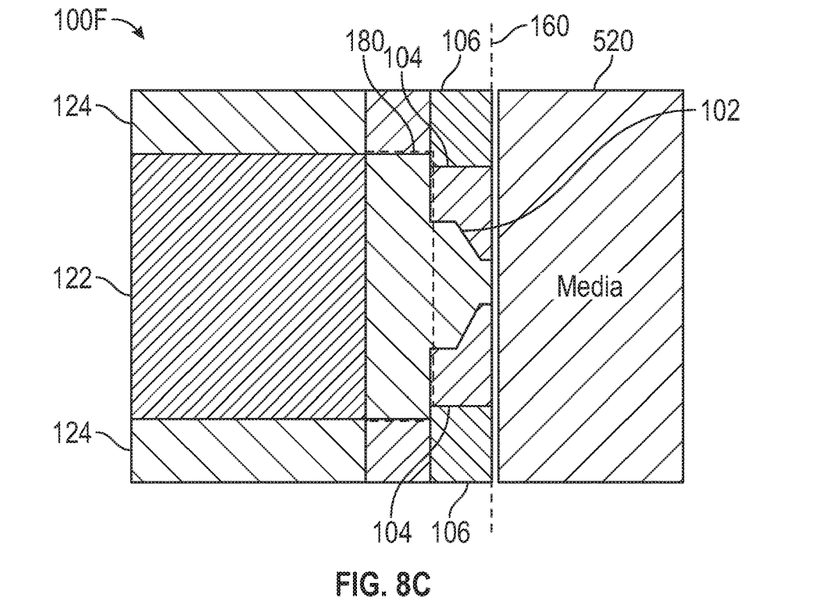
FIG. 8C is a cross-section of a new HAMR device with a hard jacket in accordance with some embodiments.
Figure 8D:
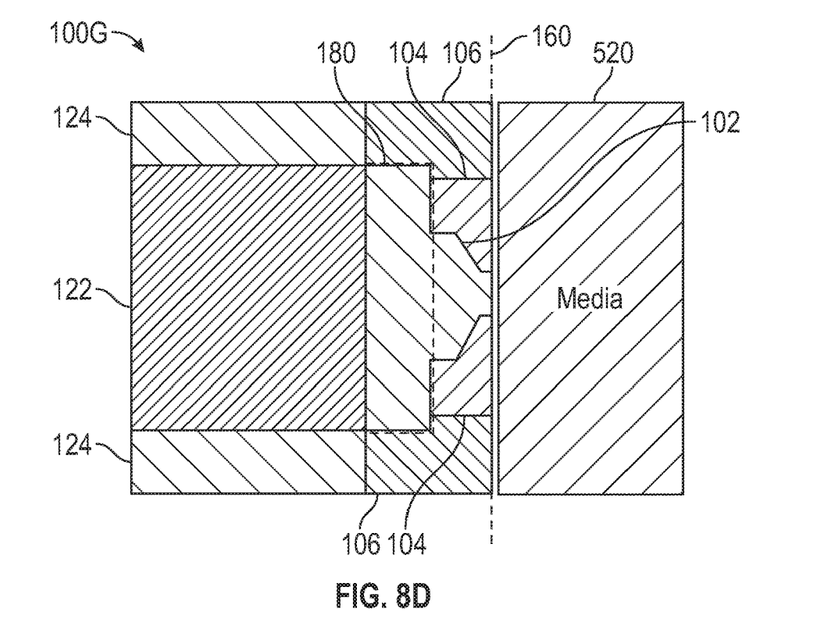
FIG. 8D is a cross-section of a new HAMR device with a hard jacket in accordance with some embodiments.

FIG. 8C is a cross-section of a new HAMR device 100F that is similar to the device of FIG. 8B (and uses the same reference numbers for similar elements), but the second layer 106 (tungsten for the simulated device) extends along the ABS 160. FIG. 8D is a cross-section of a new HAMR device 100G that is similar to the device of FIG. 8C (and uses the same reference numbers for similar elements), but the second layer 106 also extends away from the ABS 160 and toward the waveguide, thereby replacing most of the gold in the device by tungsten.

Table A below presents the thermal simulation results for the embodiments of FIGS. 8A through 8D. In all cases, the power was adjusted to reach the temperature of 800 degrees Kelvin in the middle of the recording layer of the media. Table A lists the maximum temperatures in the metal layer 142 or 104 (gold in the simulations) and within the write pole 150.

TABLE A

Simulation results for four embodiments

| Embodiment | Input power at NFT (mW) | Maximum temperature of gold (K) | Maximum temperature of write pole (K) |
| --- | --- | --- | --- |
| FIG. 8A | 5.0 | 403 | 404 |
| FIG. 8B | 5.4 | 412 | 412 |
| FIG. 8C | 5.6 | 431 | 429 |
| FIG. 8D | 9.5 | 492 | 487 |

As shown in Table A, the embodiment of FIG. 8A provides the best performance of the four simulated HAMR devices in that the input power at the NFT is lowest, as are the maximum temperatures in the first metal layer 104 and within the write pole 150. The embodiments 100E and 100F of FIGS. 8B and 8C require slightly higher input power at the NFT (5.4 and 5.6 mW, respectively, as opposed to the 5.0 mW for the embodiment of FIG. 8A) and result in slightly higher maximum temperatures in the first metal layer 104 and within the write pole 150. Thus, the embodiments 100E and 100F provide slightly degraded performance relative to the HAMR device with no hard jacket, as shown in FIG. 8A. The benefit, however, is that the embodiments 100E and 100F should result in the HAMR devices having a longer life span because the presence of the second layer 106 mitigates deformation of the NFT as explained previously.

As indicated in Table A, the embodiment 100G of FIG. 8D requires a substantially higher input power at the NFT (9.5 mW as opposed to no more than 5.6 mW for the other embodiments) and results in more significant temperature increases, and therefore results in a more significant performance degradation. The inventors believe that this degradation may be caused by the direct-fire configuration of the waveguide and NFT, and that adding one or more mirrors 170 as described in the context of FIG. 7C could reduce the likelihood of the write pole 150 overheating, thus making the embodiment 100G more viable. The embodiment 100G may also provide better performance with different materials for the NFT, such as, for example, a gold alloy instead of pure gold in the first metal layer 104.

The simulations also indicated that the effect of non-plasmonic materials outside the skin depth is insignificant. In all of the simulated cases, the dimensions of the thermal spot were approximately 40×30 nm at 650 degrees Kelvin. Thus, the hot spot provided by the new HAMR embodiments is well-localized in the middle of the recording layer of the media.

It is to be appreciated that although particular materials were selected for the simulations described herein (i.e., gold for the first metal layer 104, $SiO_2$ for the core layer 102, and tungsten for the second layer 106), similar results are expected for other materials. It is well within the skill of a person having ordinary skill in the art to select suitable materials for the core layer 102, the first metal layer 104, and the second layer 106 based on the disclosures provided herein. The disclosures herein are not limited by the exemplary materials discussed or used in simulations.

Figure 9A:
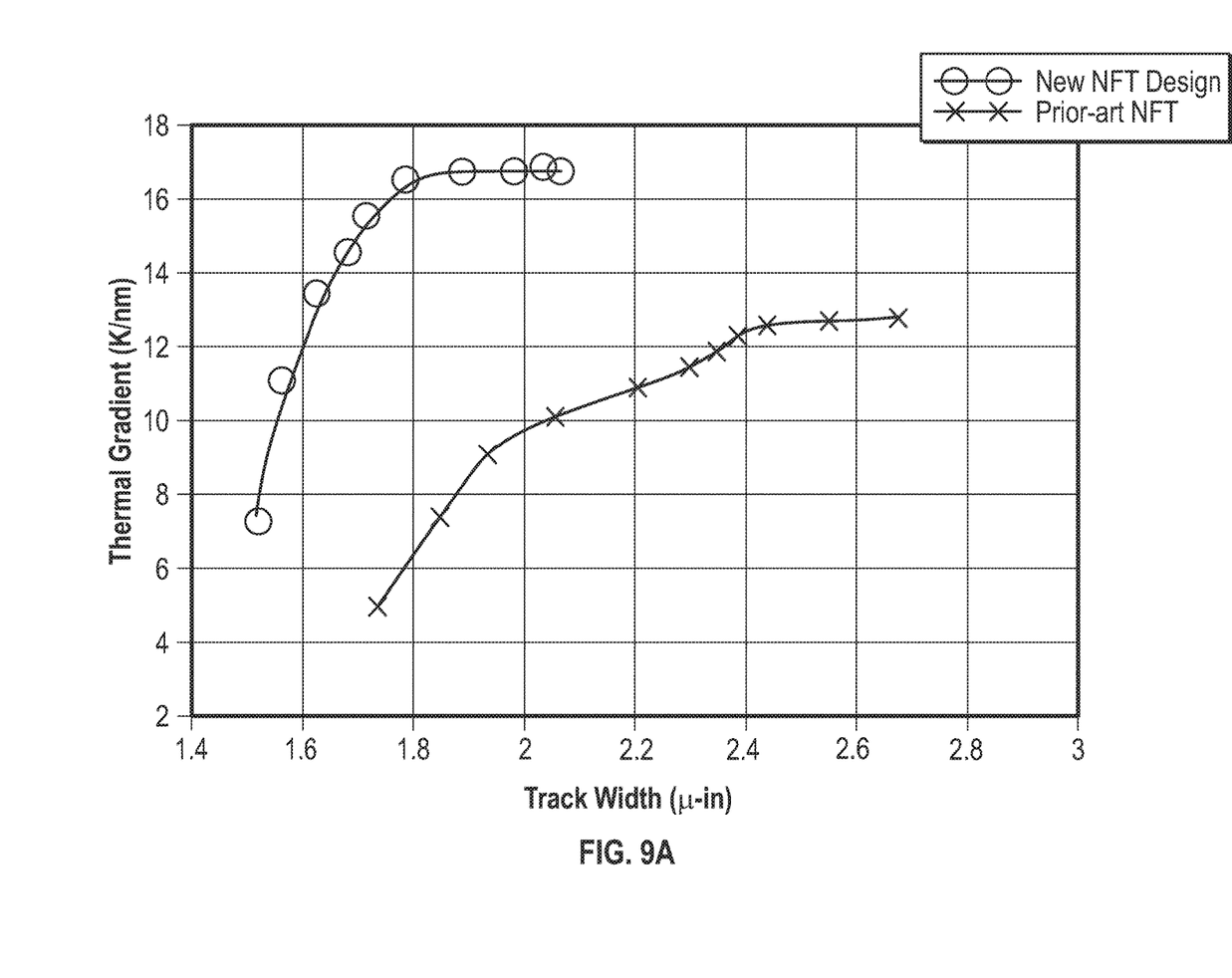
FIG. 9A is a plot showing thermal gradient as a function of track width for a prior-art HAMR device and for a new HAMR device in accordance with some embodiments.

Embodiments of the new HAMR devices also demonstrate higher thermal gradients than prior-art NFT designs, which indicates superior linear density of magnetic recording. FIG. 9A plots the thermal gradients (in degrees Kelvin per nm) of a HAMR device using a lollipop-style NFT and a HAMR device using a hard jacket as descried herein as a function of track width (in micro-inches). As shown in FIG. 9A, as the track width decreases, the embodiment using a hard jacket provides a higher thermal gradient, thereby improving the ability of the HAMR device to write to the media.

Figure 9B:
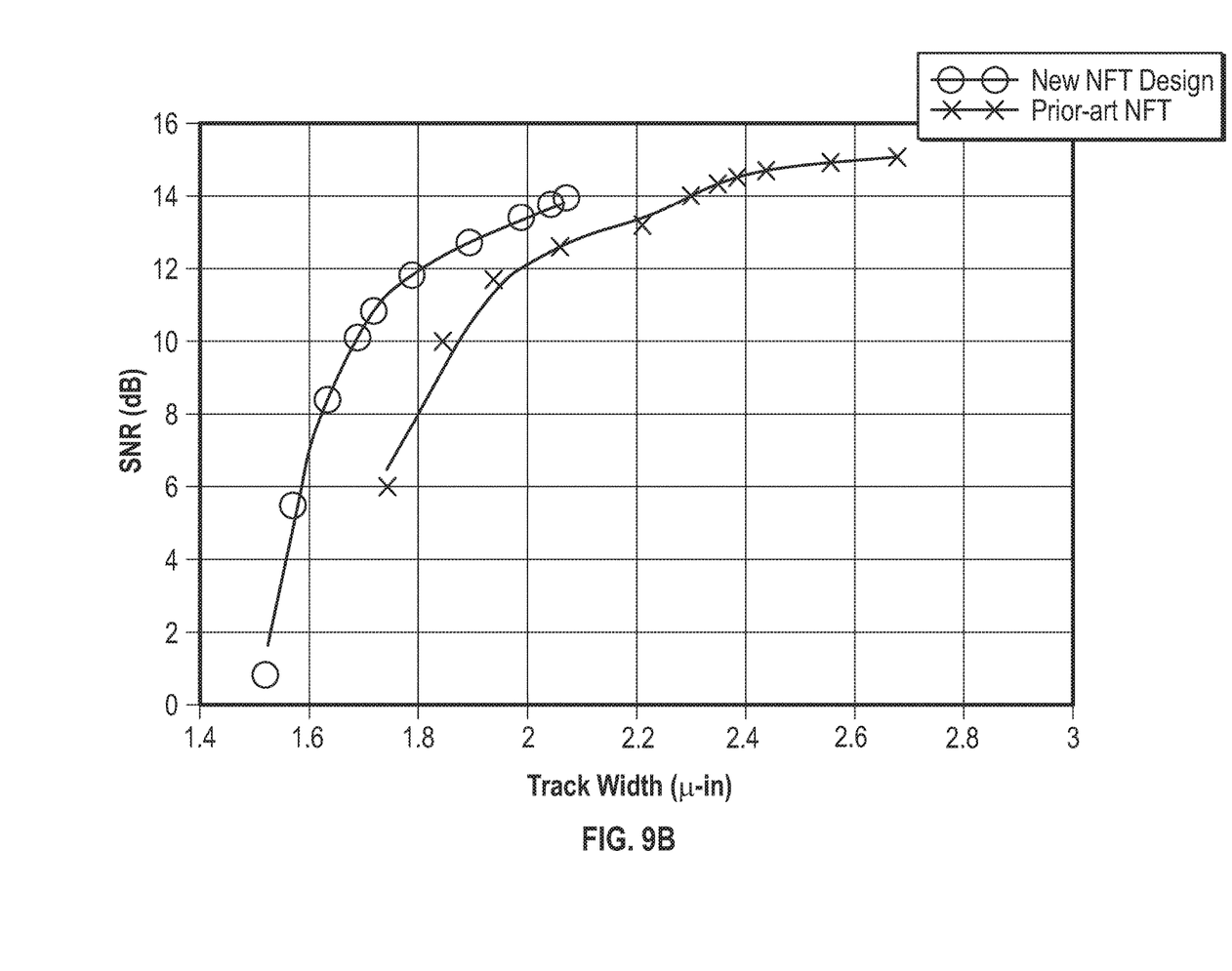
FIG. 9B is a plot showing recording SNR as a function of track width for a prior-art HAMR device and for a new HAMR device in accordance with some embodiments.

FIG. 9B confirms that embodiments of the new HAMR devices provide improved recording performance. FIG. 9B plots the signal-to-noise ratio (SNR) as a function of track width (in micro-inches) for the HAMR device using a lollipop-style NFT and a HAMR device using a hard jacket as described herein. As shown, for any selected track width, the embodiment using a hard jacket provides a higher SNR for writing, which enables data storage devices with higher areal density capacity.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

The word "coupled" refers to elements that are connected directly or through one or more intervening elements.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A heat-assisted magnetic recording (HAMR) device, comprising:
   a waveguide;
   a near-field transducer coupled to the waveguide, the near-field transducer comprising:
     a core layer comprising an insulator,
     a first metal layer adjacent to the core layer, and
     a second layer adjacent to the first metal layer, wherein the second layer comprises tungsten, chromium, SiC, or a dielectric material;
   an anti-reflective trench between the waveguide and the near-field transducer; and
   at least one mirror adjacent to the second layer of the near-field transducer.

2. The HAMR device recited in claim 1, wherein the first metal layer comprises a plasmonic metal, and wherein a thickness of the first metal layer is no less than a skin depth of the plasmonic metal.

3. The HAMR device recited in claim 1, wherein the first metal layer comprises a plasmonic metal, and wherein a thickness of the first metal layer is substantially equal to a skin depth of the plasmonic metal.

4. The HAMR device recited in claim 1, wherein the first metal layer comprises gold or a gold alloy.

5. The HAMR device recited in claim 4, wherein a thickness of the first metal layer is between approximately 30 nm and 100 nm.

6. The HAMR device recited in claim 1, wherein the first metal layer comprises Pd, Pt, Rh, Ir, Ru, Au, Cu, Al, Ag, or an alloy of two or more of Pd, Pt, Rh, Ir, Ru, Au, Cu, Ag, and Al.

7. The HAMR device recited in claim 1, wherein a thermal expansion coefficient of the second layer is lower than a thermal expansion coefficient of the core layer.

8. The HAMR device recited in claim 1, wherein a thermal expansion coefficient of the core layer is substantially matched by a thermal expansion coefficient of a combination of the first metal layer and the second layer.

9. The HAMR device recited in claim 1, wherein a thickness of the second layer is at least 2 nm.

10. The HAMR device recited in claim 1, wherein the waveguide and near-field transducer are in a direct-fire configuration.

11. The HAMR device recited in claim 1, wherein the at least one mirror is also adjacent to the anti-reflective trench.

12. The HAMR device recited in claim 11, wherein the at least one mirror has an offset lip.

13. The HAMR device recited in claim 11, wherein the first metal layer extends a first distance to an air-bearing surface (ABS) of the HAMR device, and the second layer extends a second distance toward the ABS of the HAMR device, the second distance being less than the first distance, and further comprising a dielectric layer extending from an end of the second layer to the ABS of the HAMR device.

14. The HAMR device recited in claim 1, wherein the at least one mirror has an offset lip.

15. The HAMR device recited in claim 1, wherein the first metal layer extends a first distance to an air-bearing surface (ABS) of the HAMR device, and the second layer extends a second distance toward the ABS of the HAMR device, the second distance being less than the first distance, and further comprising a dielectric layer extending from an end of the second layer to the ABS of the HAMR device.

16. The HAMR device recited in claim 1, wherein a shape of at least a portion of the core layer viewed from an air-bearing surface of the HAMR device is triangular.

17. The HAMR device recited in claim 1, wherein at least a portion of the core layer viewed from an air-bearing surface of the HAMR device has an L-shape, a C-shape, an E-shape, or a tapered shape.

18. A magnetic storage device comprising:
    a write pole; and
    the HAMR device recited in claim 1.

* * * * *